(12) United States Patent
Liu et al.

(10) Patent No.: US 11,867,846 B2
(45) Date of Patent: Jan. 9, 2024

(54) METHOD FOR RADIATION CALIBRATION OF AIRBORNE HYPERSPECTRAL IMAGING LIDAR SYSTEM

(71) Applicant: HEFEI INSTITUTE OF PHYSICAL SCIENCE, CHINESE ACADEMY OF SCIENCES, Anhui (CN)

(72) Inventors: Dong Liu, Anhui (CN); Liyong Qian, Anhui (CN); Decheng Wu, Anhui (CN); Xiaojun Zhou, Anhui (CN); Liujun Zhong, Anhui (CN); Wei Wei, Anhui (CN); Wenju Wang, Anhui (CN); Yingjian Wang, Anhui (CN)

(73) Assignee: HEFEI INSTITUTE OF PHYSICAL SCIENCE, CHINESE ACADEMY OF SCIENCES, Hefei (CN)

( * ) Notice: Subject to any disclaimer, the term of this patent is extended or adjusted under 35 U.S.C. 154(b) by 0 days.

(21) Appl. No.: 17/577,263

(22) Filed: Jan. 17, 2022

(65) Prior Publication Data
US 2022/0146651 A1 May 12, 2022

Related U.S. Application Data

(63) Continuation of application No. PCT/CN2020/112130, filed on Aug. 28, 2020.

(51) Int. Cl.
*G01S 7/497* (2006.01)
*G01S 7/481* (2006.01)
*G01S 17/89* (2020.01)

(52) U.S. Cl.
CPC ............ *G01S 7/497* (2013.01); *G01S 7/4817* (2013.01); *G01S 17/89* (2013.01)

(58) Field of Classification Search
CPC ...... G01S 17/89; G01S 7/4814; G01S 7/4817; G01S 7/497
(Continued)

(56) References Cited

U.S. PATENT DOCUMENTS

| 5,216,477 A * | 6/1993 | Korb ...................... G01S 17/95 |
| | | 356/28.5 |
| 5,371,358 A * | 12/1994 | Chang ...................... G01J 3/28 |
| | | 250/236 |
| 2016/0266244 A1 | 9/2016 | Holmes et al. |

FOREIGN PATENT DOCUMENTS

| CN | 101923162 A | 12/2010 | |
| CN | 104898100 A * | 9/2015 | ............. G01S 13/90 |
(Continued)

OTHER PUBLICATIONS

International Search Report of PCT/CN2020/112130.
(Continued)

*Primary Examiner* — John H Le
(74) *Attorney, Agent, or Firm* — Dragon Sun Law Firm, PC; Nathaniel Perkins

(57) ABSTRACT

The invention relates to the technical field of radar detection, in particular to a method for radiation calibration of airborne hyperspectral imaging LiDAR system. The method comprises the following steps: S1. A monochromator in a spectrum calibration system emits optical signals of different spectrum values to scan the radar system, thus to obtain the bandwidth and central wavelength of each channel in the radar system; S2. According to the return signal power $P_R$ ($\lambda$, z) in the hyperspectral LiDAR equation and the optical power $P_{Ref}(\lambda)$ received by the target surface of the detector in the radar system under experimental conditions, a white diffuse reflection board is taken as the ground object target, and a ranging channel is used to measure the flying height of the radar system, thus to obtain the parameters in the return signal power $P_R$ ($\lambda$, z) and the reflection spectrum $\beta_G$ ($\lambda$).

4 Claims, 1 Drawing Sheet

(58) Field of Classification Search
USPC .......................................................... 702/104
See application file for complete search history.

(56) References Cited

FOREIGN PATENT DOCUMENTS

| | | |
|---|---|---|
| CN | 104898100 A | 9/2015 |
| CN | 105424186 A | 3/2016 |
| CN | 109738372 A | 5/2019 |
| CN | 110794387 A | 2/2020 |

OTHER PUBLICATIONS

Written Opinion of PCT/CN2020/112130.
Qian Llyong et al., "Radiation Calibration and Ground Object Information Acquisition Based on High Spectral Imaging Lidar System," Acta Optica Sinica, No. vol. 40, No. 11, Jun. 10, 2020, ISSN:0253-2239, pp. 1128001-1-1128001-6, CN.

* cited by examiner

METHOD FOR RADIATION CALIBRATION OF AIRBORNE HYPERSPECTRAL IMAGING LIDAR SYSTEM

CROSS-REFERENCE TO RELATED APPLICATIONS

This application is a bypass continuation application of PCT application no.: PCT/CN2020/112130. This application claims priorities from PCT Application PCT/CN2020/112130, filed Aug. 28, 2020, and from Chinese patent application no.: 201911187001.0 filed Nov. 28, 2019, the contents of which are incorporated herein in the entirety by reference.

FIELD OF THE INVENTION

The invention relates to the technical field of LiDAR detection, in particular to a method for radiation calibration of an airborne hyperspectral imaging LiDAR system.

BACKGROUND OF THE INVENTION

In current technologies for LiDAR radiation calibration, active LiDAR ranging may be used to acquire high-resolution three-dimensional target information and passive hyperspectral imaging to acquire rich spectral information. However, the two technologies cannot achieve simultaneous acquisition of three-dimensional and spectral information. Many research institutions have attempted to combine the two technologies and have made favorable progress. The research institutions have also recognized the developing direction of "single-wavelength—multi-spectrum—hyperspectrum" of earth observation LiDAR.

One of the detection objectives of hyperspectral LiDAR, as a newer technology than conventional single-wavelength LiDAR for earth observation, is to acquire the back-reflecting spectrum data on the earth surface. However, system calibration is necessary prior to applying the spectrum data detected by the hyperspectral LiDAR system to such tasks as classification of ground targets. System calibration is very important in the application of hyperspectral LiDAR data. Existing methods for radiation calibration are mainly targeted at ground-based multispectral imaging LiDAR systems or passive hyperspectral imaging systems. There are is little to no research on the method for radiation calibration of airborne hyperspectral imaging LiDAR.

SUMMARY OF THE INVENTION

In order to solve the aforementioned problem, the invention provides a method for radiation calibration of airborne hyperspectral imaging LiDAR system, by specifically adopting the following technical solutions:

A method for radiation calibration of airborne hyperspectral imaging LiDAR system comprises the following steps:

S1. A monochromator in a spectrum calibration system emits optical signals of different spectrum values to scan the radar system, thus to obtain the bandwidth and central wavelength of each channel in the radar system;

S2. According to the return signal power $P_R$ ($\lambda$, z) in the hyperspectral LiDAR equation and the optical power $P_{Ref}$ ($\lambda$) received by the target surface of the detector in the radar system under experimental conditions, a white diffuse reflection board is taken as the ground target, and a ranging channel is used to measure the flying height of the radar system, thus to obtain the parameters in the return signal power $P_R$ ($\lambda$, z) and the reflection spectrum $\beta_G$ ($\lambda$) of the ground target detected by the hyperspectral imaging LiDAR system.

Specifically, the step S1 is as follows:

S11. A spectrum calibration mechanism is constructed with a monochromator and a beam splitting mirror arranged in sequence. Light coming out of the beam splitting mirror is split into two light paths. One directly enters a first detector, which outputs data to a first data acquisition system. The data processed in the first data acquisition system is used as the reference data. The other light path from the beam splitting mirror enters the airborne hyperspectral imaging LiDAR system subject to calibration via a rotating scan mirror, and a second detector in the radar system outputs data to a second data acquisition system;

S12. According to the spectral range of the airborne hyperspectral imaging LiDAR system, the monochromator emits, at a given precision of wavelength, optical signals at multiple wavelengths covering the spectral range of the radar system. The first data acquisition system and the second data acquisition system obtain a first current signal value $I_n$ and a second current signal value $I'_n$ corresponding to the optical signal at a wavelength of $\lambda_n$, and determine the responding channel in the first detector when the optical signal is input;

S13. After the optical signals of all wavelengths are fully input, the spectral range of each channel is obtained in the radar system, the central wavelength $\lambda_{NCE}$ of each channel is obtained according to current ratio, and the bandwidth of the $n^{th}$ channel, i.e., the spectral resolution in the $n^{th}$ channel, is defined based on full width at half maximum $\Delta\lambda_n$.

Specifically, a halogen lamp and a power supply therefor are provided in front of the monochromator.

Specifically, the steps of obtaining the central wavelength $\lambda_{NCE}$ in the step S13 are as follows:

S131. The second current signal value $I'_n$ is divided by the first current signal value $I_n$ detected simultaneously to obtain the current signal ratio $I'_n/I_n$ of the $n^{th}$ channel with a wavelength of $\lambda_n$;

S132. The wavelength at the current signal ratio $(I'_n/I_n)_{max}$ under ideal conditions is obtained, which is the central wavelength $\lambda_{NCE}$ of the channel.

Specifically, the step S2 is as follows:

(a). According to the operating mode of "single emitting and multiple receiving" of the radar system, the return signal power $P_R$ ($\lambda$, z) in the multi-channel hyperspectral LiDAR equation can be expressed as follows:

$$P_R(\lambda, z) = \rho_0 \eta(\lambda) \Delta\lambda \beta_0(\lambda) \frac{D_R^2}{8z^2} x(\lambda) [T_{atm}(\lambda, 0, z)]^2 \quad (1)$$

$$= c(\lambda) \beta_0(\lambda) \frac{D_R^2}{8z^2} [T_{atm}(\lambda, 0, z)]^2$$

$$= I(\lambda)/R$$

Where $\lambda$ is the central wavelength $\lambda_{NCW}$ of each channel obtained during spectrum calibration, $P_R$ ($\lambda$, z) is the optical power of the return signal received by the LiDAR system channel with the central wavelength of $\lambda$, in the unit of W; $\rho_0$ is the average spectral power density output by the laser, in the unit of W/nm; $\eta$ ($\lambda$) is a normalized function of the power density spectrum of the average spectral power density of the laser; $\Delta\lambda$ is the corresponding spectral bandwidth in one channel, in the unit of nm; $\beta_G$ ($\lambda$) is the reflectivity of the ground target; $D_R$ is the effective clear aperture of the receiving telescope, in the unit of m; z is the distance between the LiDAR and the measured ground surface, in the unit of m, z can be measured in real time through a ranging channel; $\varepsilon$ ($\lambda$) is the optical efficiency of the LiDAR system; $T_{atm}$ ($\lambda$, O, z) is the transmittance of the atmosphere between the LiDAR and the measured ground surface at wavelength of $\lambda$; I ($\lambda$) is the actual signal intensity of the ground target; R is the responsivity of the detector in the corresponding channel; $c(\lambda) = \rho_0 \eta(\lambda) \Delta\lambda \varepsilon(\lambda)$, c ($\lambda$) is the power intensity of the light pulse energy emitted by the laser into the detector in the radar system;

(b). During calibration under experimental conditions, the optical power $P_{Ref}$ ($\lambda$) received by the target surface of the detector in the LiDAR system can be obtained as the following formula:

$$P_{Ref}(\lambda) = C(\lambda)R(\lambda) = I_{Ref}(\lambda)/R \qquad (2)$$

Where R ($\lambda$) is the coupling efficiency of the separated laser light entering the radar system, and $I_{Ref}$ ($\lambda$) is the current output by each channel of the detector in the radar system that can be detected;

(c). The effective clear aperture $D_R$ of the receiving telescope is obtained in the radar system. A standard white diffuse reflection board is taken as the ground target, onto which a laser pulse is emitted by the radar system. The distance between the radar system and the white board is known, so it is possible to obtain the effective clear aperture $D_R$ of the receiving telescope in the system and further to obtain the calibration parameters $C_{Cor}$ ($\lambda$) of each channel in the system:

$$C_{Cal}(\lambda) = \frac{R(\lambda)}{D_R^2} \qquad (10)$$

(d). A corner reflector is adopted in the detection area of the radar system to obtain the laser power output by the target surface of the detector in each channel of the radar system:

$$P_{Cor}(\lambda) = \rho_0 \eta(\lambda) \Delta\varepsilon(\lambda) Q(\lambda) = \frac{I_{Cor}(\lambda)}{R} \qquad (3)$$

Q ($\lambda$) is the optical efficiency reflected by the corner reflector; $I_{Cor}$ ($\lambda$) is the current signal value of the laser pulse signal reflected by the corner reflector in each channel Q ($\lambda$) and $I_{Cor}$ ($\lambda$) can be accurately detected. Formula ($\lambda$) is divided by Formula (3) to obtain:

$$\frac{P_{Ref}(\lambda)}{P_{Cor}(\lambda)} = \frac{R(\lambda)}{Q(\lambda)} = \frac{I_{Ref}(\lambda)}{I_{Cor}(\lambda)} \qquad (4)$$

and R ($\lambda$) is obtained;

(e). In the repetition frequency of one pulse, the capture card of the radar system needs to capture the signal intensity for three times: the intensity of light separated from the laser $I_{Ref}$ ($\lambda$), the intensity of return signal reflected by the ground target I' ($\lambda$) and the background noise of the system $I_{BG}$ ($\lambda$). When there is no laser pulse signal in the radar system, the intensity data output by the detector in the radar system is the background noise of the system; the intensity of the return signal I' ($\lambda$) includes the actual signal intensity of the ground target I ($\lambda$) and the background noise of the system $I_{BG}$ ($\lambda$); that is, when the radar system is operating an airborne flying experiment, the signal output by the detector in each channel of the receiving system I' ($\lambda$) is:

$$I'(\lambda) = I(\lambda) + i \, I_{max}(\lambda) \qquad (7)$$

Finally, the actual reflection spectrum of the ground target $\beta_G$ ($\lambda$) during airborne flying process of the radar system is obtained by substituting Formulas ($\lambda$), (7) and (10) and R ($\lambda$) into Formula (1):

$$\beta_G(\lambda) = \frac{[T(\lambda) - I_{Ref}(\lambda)] \cdot 8z^2 \cdot C_{Cal}(\lambda)}{[T_{atm}(\lambda, 0, z)]^2 I_{Ref}(\lambda)}. \qquad (11)$$

The invention has the following advantages:
(1) The invention obtains the bandwidth and central wavelength of each channel in the radar system with a spectrum calibration system to achieve spectrum calibration, and detects the actual reflection spectrum $\beta_G$ ($\lambda$) with a hyperspectral imaging LiDAR system to achieve radiation calibration. The method solves the problem of radiation calibration of airborne hyperspectral imaging LiDAR system.
(2) The invention obtains the radiation calibration parameters of each channel in the radar system according to the hyperspectral LiDAR equation such that during the airborne flying process of the hyperspectral LiDAR, the intensity data output by the detector in each channel may be used to obtain the reflection spectrum data of the ground target in real time, thus achieving highly precise acquisition of the topographic data and hyperfine classification of the earth surface data.
(3) The method adopts a beam splitting mirror for simultaneous detection to achieve spectrum calibration, reducing the influence of instability of the lamp on the system radiation calibration and improving the precision and efficiency of detection.

Figure 1:
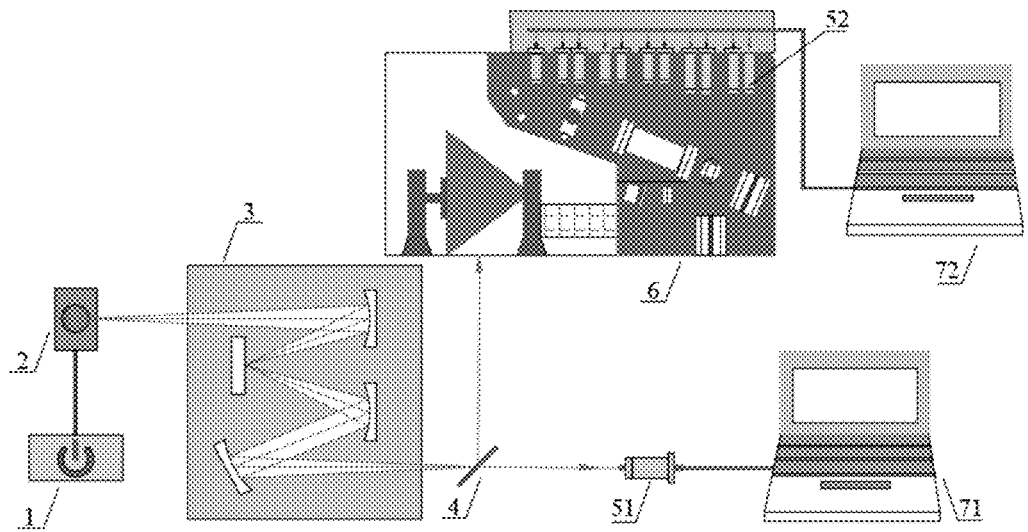
FIG. 1 is a structural diagram of the airborne hyperspectral imaging LiDAR system in coordination with the spectrum calibration system according to the invention.

Designations in the Drawings:
1—power supply, 2—halogen lamp, 3—monochromator, 4—beam splitting mirror, 51—first detector, 6—radar system, 71—first data system, 52—second detector, 72—second data system

DETAILED DESCRIPTION OF THE PREFERRED EMBODIMENTS

A method for radiation calibration of airborne hyperspectral imaging LiDAR system comprises the following steps:
S1. A monochromator in a spectrum calibration system emits optical signals of different spectrum values to scan the radar system, thus obtaining the bandwidth and central wavelength of each channel in the radar system;
S2. According to the return signal power $P_R$ ($\lambda$, z) in the hyperspectral LiDAR equation and the optical power $P_{Ref}(\lambda)$ received by the target surface of the detector in the radar system under experimental conditions, a white diffuse reflection board is taken as the ground target, and a ranging channel is used to measure the flying height of the radar system, thus obtaining the parameters in the return signal power $P_R(\lambda, z)$ and the reflection spectrum $\beta_G(\lambda)$ of the ground target detected by the hyperspectral imaging LiDAR system.

Step S1 is used to achieve spectrum calibration and S2 radiation calibration, which will be described in detail as follows.

Spectrum Calibration

S11. As shown in FIG. 1, a spectrum calibration mechanism is constructed with a power supply, a lamp, a monochromator and a beam splitting mirror arranged in sequence. Light coming out of the beam splitting mirror is split into two light paths. One directly enters a first detector, which outputs data to a first data acquisition system. The data processed in the first data acquisition system is used as the reference data. The other light path from the beam splitting mirror enters the airborne hyperspectral imaging LiDAR system subject to calibration via a rotating scan mirror, and a second detector in the radar system outputs data to a second data acquisition system.

S12. According to the spectral range of the airborne hyperspectral imaging LiDAR system, the monochromator emits, at a given precision of wavelength, optical signals at multiple wavelengths covering the spectral range of the radar system. The first data acquisition system and the second data acquisition system obtain a first current signal value and a second current signal value corresponding to the optical signal at a wavelength, and determine the responding channel in the first detector when the optical signal is input.

The wavelength precision of the monochromator is 0.2 nm, and the spectral resolution is also 0.2 nm. The spectral range of the radar system covers 400-900 nm. Starting from 400 nm, the monochromator outputs 400 nm, 400.2 nm, 400.4 nm, . . . , 900 nm in sequence, and outputs optical signals at an interval of 0.2 nm. The method of simultaneous detection with a beam splitting mirror reduces the influence of instability of the lamp on the system radiation calibration and improves the precision and efficiency of detection. The light emitted by the monochromator is split by the beam splitting mirror. Part of the split light is directly transmitted to the target surface of the first detector. The first data acquisition system directly detects the first current signal values, respectively recorded as $I_{400}, I_{400.2}, I_{400.4}, \ldots, I_{900}$; the other part of the energy enters the radar system through the rotating scan mirror, and is then split by the grating and transmitted to the target surface of the corresponding detector through the subsequent coupling light path system. The detected current signal values are finally obtained in the second data acquisition system at the terminal, which are respectively recorded as $I'_{400}, I'_{400.2}, I'_{400.4} \ldots, I'_{900}$.

Figure 2:
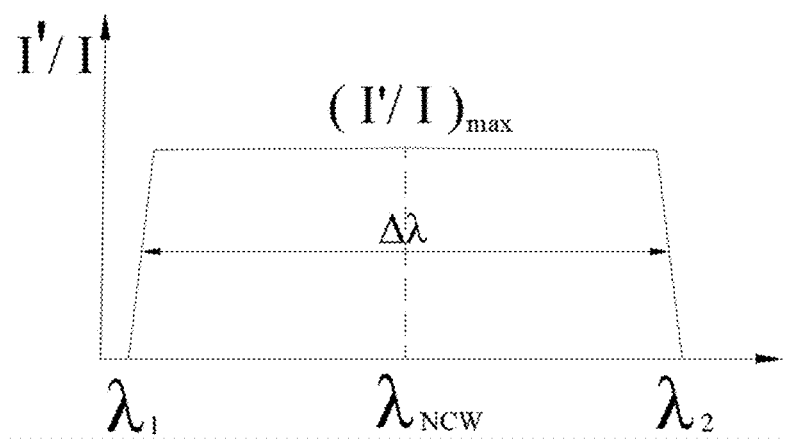
FIG. 2 is a diagram of bandwidth and central wavelength at spectrum calibration.

S13. As shown in FIG. 2, after the optical signals of all wavelengths are fully input, the spectral range of each channel is obtained in the radar system, the central wavelength $\lambda_{NCE}$ of each channel is obtained according to current ratio, and the bandwidth of the $n^{th}$ channel, i.e., the spectral resolution in the $n^{th}$ channel, is defined based on full width at half maximum $\Delta\lambda_n$.

The steps of obtaining the central wavelength $\lambda_{NCE}$ in the step S13 are as follows:

S131. The second current signal value $I'_n$ is divided by the first current signal value $I_n$ detected simultaneously to obtain the current signal ratio $I'_n/I_n$ of the $n^{th}$ channel with a wavelength of $\lambda_n$;

S132. The wavelength at the current signal ratio $(I'_n/I_n)_{max}$ under ideal conditions is obtained, which is the central wavelength $\lambda_{NCW}$ of the channel.

Radiation Calibration (a). According to the operating mode of "single emitting and multiple receiving" of the radar system, the return signal power $P_R(\lambda, z)$ in the multi-channel hyperspectral LiDAR equation can be expressed as follows:

$$P_R(\lambda, z) = \Sigma \rho_0 \eta(\lambda) \Delta\lambda \beta_G(\lambda) \frac{D_R^2}{8z^2} \varepsilon(\lambda)[T_{atm}(\lambda, O, z)]^2 \qquad (1)$$

$$= c(\lambda)\beta_G(\lambda)\frac{D_R^2}{8z^2}[T_{atm}(\lambda, O, z)]_2$$

$$= I(\lambda)/R$$

Where, $\lambda$ is the central wavelength $\lambda_{NCW}$ of each channel obtained during spectrum calibration, $P_R(\lambda, z)$ is the optical power of the return signal received by the LiDAR system channel with the central wavelength of $\lambda$, in the unit of W; $\rho_0$ is the average spectral power density output by the laser, in the unit of W/nm; $\eta(\lambda)$ is a normalized function of the power density spectrum of the average spectral power density of the laser; $\Delta\lambda$ is the corresponding spectral bandwidth in one channel, in the unit of nm; $\beta_G(\lambda)$ is the reflectivity of the ground target; DR is the effective clear aperture of the receiving telescope, in the unit of m; z is the distance between the LiDAR and the measured ground surface, in the unit of m, z can be measured in real time through the ranging channel; $\varepsilon(\lambda)$ is the optical efficiency of the LiDAR system; $T_{atm}(\lambda, O, z)$ is the transmittance of the atmosphere between the LiDAR and the measured ground surface at wavelength of $\lambda$; $I(\lambda)$ is the actual signal intensity of the ground target; R is the responsivity of the detector in the corresponding channel; $C(\lambda)=\rho_0\eta(\lambda)\Delta\lambda\varepsilon(\lambda)$, $c(\lambda)$ is the power intensity of the light pulse energy emitted by the laser into the detector in the radar system. The ultimate objective of radiation calibration of hyperspectral imaging LiDAR is to obtain the actual reflection data of the ground target, i.e., $\beta_G(\lambda)$ in the above equation. Therefore, it is necessary to solve the $\beta_G(\lambda)$ according to the above equation.

During calibration under experimental conditions, the optical power received by the target surface of the detector in the radar system is:

$$P_{Ref}(\lambda)=\rho_0\eta(\lambda)\Delta\lambda\varepsilon(\lambda)R(\lambda) \qquad (2)$$

$R(\lambda)$ is the coupling efficiency of the separated laser light entering the radar system. The current output by the detector in each channel of the radar system is recorded as $I_{Ref}(\lambda)$, which can be expressed as $I_{Ref}=P_{Ref}(\lambda)R$.

A corner reflector is adopted to introduce part of the laser light directly to the radar system, and the laser power received by the target surface of the detector in each channel of the radar system is:

$$P_{Cor}(\lambda) = \rho_0\eta(\lambda)\Delta\lambda\varepsilon(\lambda)Q(\lambda) = \frac{I_{Cor}(\lambda)}{R} \qquad (3)$$

$Q(\lambda)$ is the optical efficiency reflected by the corner reflector that can be accurately detected. During calibration under experimental conditions, the laser pulse signal through the rotating mirror is directly coupled to the radar system by the corner reflector. $I_{Cor}(\lambda)$ is the current signal value of the laser pulse signal reflected by the corner reflector in each channel Therefore, Formula (2) is divided by Formula (3) to obtain:

$$\frac{P_{Ref}(\lambda)}{P_{Cor}(\lambda)} = \frac{R(\lambda)}{Q(\lambda)} = \frac{I_{Ref}(\lambda)}{I_{Cor}(\lambda)} \quad (4)$$

The coupling efficiency R ($\lambda$) is obtained of the laser light separated from the laser entering the radar system, and is then substituted into Formula (2) to obtain:

$$C(\lambda) = \rho_0 \eta(\lambda) \Delta \lambda \varepsilon(\lambda) = \frac{I_{Ref}(\lambda)}{R(\lambda)R} \quad (5)$$

Formula (5) is substituted into the hyperspectral LiDAR equation to obtain the reflectivity spectral line of the ground target:

$$\beta_0(\lambda) = \frac{8z^2}{D_R^2} \frac{P_R(\lambda, z)}{C(\lambda)[T_{atm}(\lambda, 0, z)]^2} \quad (6)$$

In the actual reflectivity spectrum of the ground target, the background noise of the system itself has a certain influence on the reflection spectral line $\beta_G$ ($\lambda$), so the noise needs to be eliminated. In the repetition frequency of one pulse, the capture card of the radar system needs to capture the signal intensity for three times: the intensity of light separated from the laser $I_{Ref}$ ($\lambda$), the intensity of return signal reflected by the ground target I' ($\lambda$) and the background noise of the system $I_{BG}$ ($\lambda$).

When there is no laser pulse signal in the radar system, the intensity data output by the detector in the radar system is the background noise of the system. Within one laser pulse cycle, the return signal intensity I' ($\lambda$) output by each channel of the receiving system includes the actual signal intensity of the ground target I ($\lambda$) and the background noise of the system $I_{BG}$ ($\lambda$). When the radar system is operating an airborne flying experiment, the signal I' ($\lambda$) output by the detector in each channel of the receiving system is:

$$I'(\lambda) = I(\lambda) + I_{BG}(\lambda) \quad (7)$$

Formula (7) is substituted into Formula (6) to obtain:

$$\beta_0(\lambda) = \frac{8z^2}{D_R^2} \frac{[I'(\lambda) - I_{BG}(\lambda)] \cdot R(\lambda)}{I_{Ref}(\lambda) \cdot [T_{atm}(\lambda, 0, z)]^2} \quad (8)$$

During calibration under experimental conditions, the influence of atmospheric transmittance on the system calibration is not considered. At this time, Formula (8) is further simplified to obtain:

$$\beta_0(\lambda) = \frac{8z^2}{D_R^2} \frac{[I'(\lambda) - I_{BG}(\lambda)] \cdot R(\lambda)}{I_{Ref}(\lambda)} \quad (9)$$

In order to obtain the effective clear aperture $D_R$ of the receiving telescope, a standard white diffuse reflection board is taken as the ground target, onto which a laser pulse is emitted by the radar system. The distance between the radar system and the white board is known, so it is possible to obtain the effective clear aperture D R of the receiving telescope in the system and further to obtain the calibration parameters of each channel in the system:

$$C_{Cal}(\lambda) = \frac{R(\lambda)}{D_R^2} \quad (10)$$

The actual reflection spectrum $\beta_G$ ($\lambda$) of the ground target during airborne flying process of the radar system is obtained by substituting Formula (10) into Formula (8):

$$\beta_G(\lambda) = \frac{[I'(\lambda) - I_{BG}(\lambda)] \cdot 8z^2 \cdot C_{Cal}(\lambda)}{[T_{atm}(\lambda, 0, z)]^2 I_{Ref}(\lambda)} \quad (11)$$

When the radar system is operating the airborne flying experiment, the atmospheric transmittance is mainly affected by both the extinction coefficient of atmospheric molecules and the extinction coefficient of aerosol. During the airborne flying process, the extinction coefficient of atmospheric molecules can be obtained based on the standard atmospheric model and calculations made by surface meteorological observation stations, and the extinction coefficient of aerosol can be obtained by inversion of the full-waveform band signal of the hyperspectral LiDAR. The extinction coefficient of atmospheric molecules in the near surface layer only has a slight influence on calculation of the extinction coefficient of atmospheric molecules within the visible light band. It is the extinction coefficient of aerosol that causes the extinction coefficient in the lower layers.

When the airborne hyperspectral LiDAR is operating in the air, the flying height z can be measured in real time with the ranging channel. According to the signal intensity I' ($\lambda$) output by the detector in each channel, the intensity of light separated from the laser $I_{Ref}$ ($\lambda$) and the intensity of background noise $I_{BG}$ ($\lambda$) within one laser pulse cycle, as well as the atmospheric transmittance $T_{atm}$ ($\lambda$, O, z) obtained by inversion of the return signal and the calibration coefficient $C_{Cal}$ ($\lambda$) of each detection channel, the corresponding relationship between the central wavelength $\lambda$ and $\beta_G$ ($\lambda$) of each channel can be obtained by substituting into Formula (11), which covers in real time the reflection spectrum data of the ground target within the wide spectral band of the hyperspectral LiDAR.

The above are the preferred embodiments rather than the limitations of the invention. Any amendment, equivalent replacement and improvement made within the range of the spirit and rule of the invention shall be included in the protection scope of the invention.

The invention claimed is:
1. A method for radiation calibration of airborne hyperspectral imaging LiDAR system, comprising the following steps:
   S1. A monochromator in a spectrum calibration system emits optical signals of different spectrum values to scan the radar system, thus to obtain the bandwidth and central wavelength of each channel in the radar system;
   S2. According to the return signal power $P_R$ ($\lambda$, z) in the hyperspectral LiDAR equation and the optical power $P_{Ref}$ ($\lambda$) received by the target surface of the detector in the radar system under experimental conditions, a white diffuse reflection board is taken as the ground object target, and a ranging channel is used to measure the flying height of the radar system, thus to obtain the parameters in the return signal power $P_R$ ($\lambda$, z) and the reflection spectrum $\beta_G(\lambda)$ of the ground object detected by the hyperspectral imaging LiDAR system;

the step S1 is specified as follows:

S11. A spectrum calibration mechanism is constructed with a monochromator and a beam splitting mirror arranged in sequence; light coming out of the beam splitting mirror is split into two light paths; one directly enters a first detector, which outputs data to a first data acquisition system; the data processed in the first data acquisition system is used as the reference data; the other light path from the beam splitting mirror enters the airborne hyperspectral imaging LiDAR system subject to calibration via a rotating scan mirror, and a second detector in the radar system outputs data to a second data acquisition system;

S12. According to the spectral range of the airborne hyperspectral imaging LiDAR system, the monochromator emits, at a given precision of wavelength, optical signals at multiple wavelengths covering the spectral range of the radar system; the first data acquisition system and the second data acquisition system obtain a first current signal value $I_n$ and a second current signal value $I'_n$ corresponding to the optical signal at a wavelength of $\lambda_n$, and determine the responding channel in the first detector when the optical signal is input;

S13. After the optical signals of all wavelengths are fully input, the spectral range of each channel is obtained in the radar system, the central wavelength $\lambda_{NCE}$ of each channel is obtained according to current ratio, and the bandwidth of the $n^{th}$ channel is defined based on full width at half maximum $\Delta\lambda_n$.

2. The method for radiation calibration of airborne hyperspectral imaging LiDAR system according to claim 1, wherein a halogen lamp and a power supply therefor are provided in front of the monochromator.

3. The method for radiation calibration of airborne hyperspectral imaging LiDAR system according to claim 2, wherein the steps of obtaining the central wavelength $\lambda_{NCE}$ in the step S13 are specified as follows:

S131. The second current signal value $I'_n$ is divided by the first current signal value $I_n$ detected simultaneously to obtain the current signal ratio $I'_n/I_n$ of the $n^{th}$ channel with a wavelength of $\lambda_n$;

S132. The wavelength at the current signal ratio $(I'_n/I_n)_{max}$ under ideal conditions is obtained, which is the central wavelength $\lambda_{NCW}$ of the channel.

4. The method for radiation calibration of airborne hyperspectral imaging LiDAR system according to claim 1, wherein the step S2 is specified as follows:

(a). According to the operating mode of "single emitting and multiple receiving" of the radar system, the return signal power $P_R(\lambda, z)$ in the multi-channel hyperspectral LiDAR equation can be expressed as follows:

$$P_R(\lambda, z) = \Sigma_0 \eta(\lambda) \Delta \lambda \beta_G(\lambda) \frac{D_R^2}{8z^2} \varepsilon(\lambda) [T_{atm}(\lambda, O, z)]^2 \quad (1)$$

$$= c(\lambda)\beta_G(\lambda) \frac{D_R^2}{8z^2} [T_{atm}(\lambda, O, z)]_2$$

$$= I(\lambda)/R$$

where, $\lambda$ is the central wavelength $\lambda_{NCW}$ of each channel obtained during spectrum calibration, $P_R(\lambda, z)$ is the optical power of the return signal received by the LiDAR system channel with the central wavelength of $\lambda$, in the unit of W; $\rho_0$ is the average spectral power density output by the laser, in the unit of W/nm; $\eta(\lambda)$ is a normalized function of the power density spectrum of the average spectral power density of the laser; $\Delta\lambda$ is the corresponding spectral bandwidth in one channel, in the unit of nm; $\beta_G(\lambda)$ is the reflectivity of the ground object; DR is the effective clear aperture of the receiving telescope, in the unit of m; z is the distance between the LiDAR and the measured ground surface, in the unit of m, z can be measured in real time through the ranging channel; $\varepsilon(\lambda)$ is the optical efficiency of the LiDAR system; $T_{atm}(\lambda, O, z)$ is the transmittance of the atmosphere between the LiDAR and the measured ground surface at wavelength of $\lambda$; $I(\lambda)$ is the actual signal intensity of the ground object; R is the responsivity of the detector in the corresponding channel; $c(\lambda)=\rho_0\eta(\lambda)\Delta\lambda\varepsilon(\lambda)$, $c(\lambda)$ is the power intensity of the light pulse energy emitted by the laser into the detector in the radar system;

(b). During calibration under experimental conditions, the optical power $P_{Ref}(\lambda)$ received by the target surface of the detector in the radar system can be obtained as the following formula:

$$P_{Ref}(\lambda)=C(\lambda)R(\lambda)=I_{Ref}(\lambda)/R \quad (2)$$

where, $R(\lambda)$ is the coupling efficiency of the separated laser light entering the radar system, and $I_{Ref}(\lambda)$ is the current output by each channel of the detector in the radar system that can be detected;

(c). The effective clear aperture $D_R$ of the receiving telescope is obtained in the radar system; a standard white diffuse reflection board is taken as the ground object target, onto which a laser pulse is emitted by the radar system; the distance between the radar system and the white board is known, so it is possible to obtain the effective clear aperture $D_R$ of the receiving telescope in the system and further to obtain the calibration parameters $C_{cal}(\lambda)$ of each channel in the system:

$$C_{Cal}(\lambda) = \frac{R(\lambda)}{D_R^2} \quad (10)$$

(d). A corner reflector is adopted in the detection area of the radar system to obtain the laser power output by the target surface of the detector in each channel of the radar system:

$$P_{Cor}(\lambda) = \rho_0 \eta(\lambda) \Delta \lambda \varepsilon(\lambda) Q(\lambda) = \frac{I_{Cor}(\lambda)}{R} \quad (3)$$

$Q(\lambda)$ is the optical efficiency reflected by the corner reflector; $I_{Cor}(\lambda)$ is the current signal value of the laser pulse signal reflected by the corner reflector in each channel; $Q(\lambda)$ and $I_{Cor}(\lambda)$ can be accurately detected; Formula (2) is divided by Formula (3) to obtain:

$$\frac{P_{Ref}(\lambda)}{P_{Cor}(\lambda)} = \frac{R(\lambda)}{Q(\lambda)} = \frac{I_{Ref}(\lambda)}{I_{Cor}(\lambda)} \quad (4)$$

and $R(\lambda)$ is obtained;

(e). In the repetition frequency of one pulse, the capture card of the radar system needs to capture the signal intensity for three times: the intensity of light separated from the laser $I_{Ref}(\lambda)$, the intensity of return signal reflected by the ground object $I'(\lambda)$ and the background noise of the system $I_{BG}(\lambda)$; when there is no laser pulse signal in the radar system, the intensity data output by the detector in the radar system is the background noise of the system; the intensity of the return signal $I'(\lambda)$ includes the actual signal intensity of the ground object $I(\lambda)$ and the background noise of the system $I_{BG}(\lambda)$; that is, when the radar system is operating an airborne flying experiment, the signal $I'(\lambda)$ output by the detector in each channel of the receiving system is:

$$I'(\lambda) = I(\lambda) + I_{BG}(\lambda) \tag{7}$$

finally, the actual reflection spectrum of the ground object $\beta_G(\lambda)$ during airborne flying process of the radar system is obtained by substituting Formulas (2), (7) and (10) and $R(\lambda)$ into Formula (1):

$$\beta_G(\lambda) = \frac{[I'(\lambda) - I_{BG}(\lambda)] \cdot 8z^2 \cdot C_{Cal}(\lambda)}{[T_{atm}(\lambda, 0, z)]^2 I_{Ref}(\lambda)}. \tag{11}$$

\* \* \* \* \*